Oct. 29, 1940.    B. O. JOHANSSON    2,219,366
ARRANGEMENT OF LIQUID LEVEL GAUGES
Filed April 21, 1939
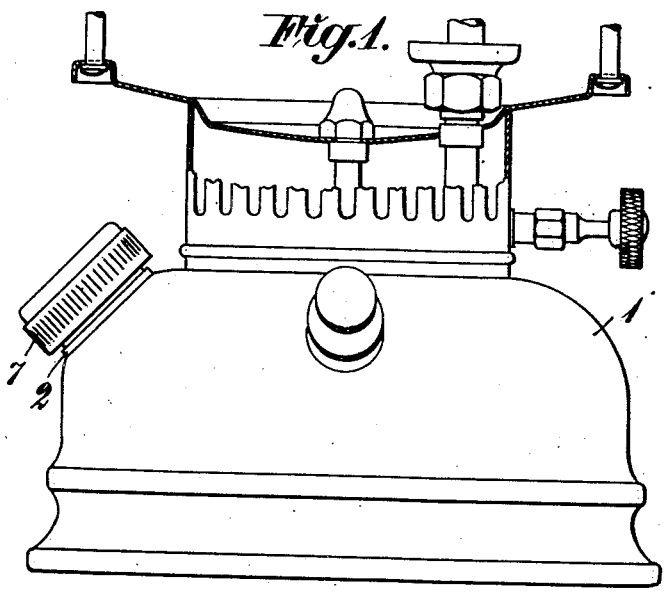
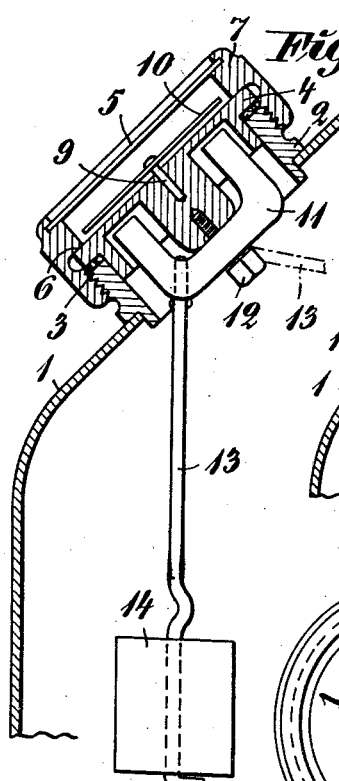
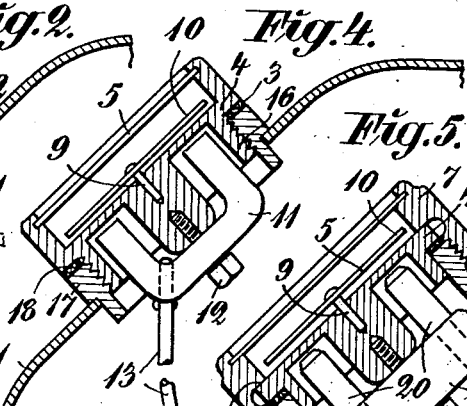
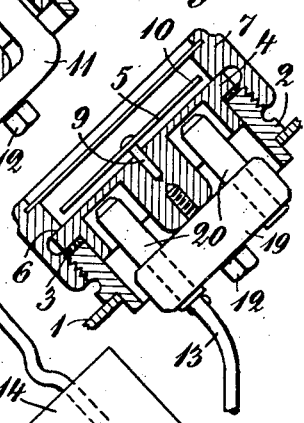
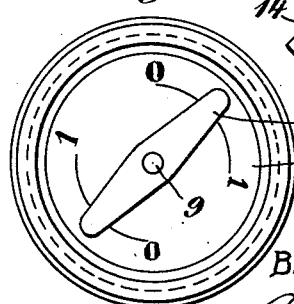
INVENTOR:
BENGT OLOV JOHANSSON
BY Haseltine Lake & Co
ATTORNEYS Patented Oct. 29, 1940

2,219,366

UNITED STATES PATENT OFFICE 2,219,366

ARRANGEMENT OF LIQUID LEVEL GAUGES

Bengt Olov Johansson, Stockholm, Sweden

Application April 21, 1939, Serial No. 269,149
In Sweden May 24, 1938

1 Claim. (Cl. 73—317)

The present invention relates to improvements of such float-operated liquid level gauges particularly for fuel containers, in which the position of the float and thus the liquid level is registered by a pointer being pivotally journalled about an axis on the outside of the container, said pointer being operated by a float-actuated magnet arranged inside the container and pivotally journalled about a separate axis being in alignment with the axis of the pointer.

In hitherto known devices of this kind the motions of the float have been transmitted to the magnet by means of toothed gears and rotatably journalled shafts, or the magnet has been directly sunk into the liquid, thereby making an inspection impossible without at first emptying the container or partially shutting off the same by means of valves or the like.

According to the present invention these disadvantages are removed in a quite simple manner by journalling rotatably the magnet and the pointer, being directly actuated by the magnet, on opposite sides of a cover member, which is tightly closing an opening in the container above the liquid level, whereas the float, being situated in the liquid, is rigidly or movably connected to the one end of a rod or arm, the other end of which is connected to the magnet in such a manner that the float will act with a lever on the axis of rotation of the magnet. Said cover member may be secured to a sleeve, being inserted in the opening and threaded on the outside, by means of a clamping ring being screwed on the sleeve and provided with an abutment flange and, if desired, with a window.

According to another embodiment of the invention the cover member may be provided, firstly with an inwardly projecting sleeve-formed flange being threaded on the outside and screwed into a sleeve being inserted in the opening and threaded on the inside, and secondly with a flange of abutment which, upon screwing the sleeve-formed flange inwards, abuts against the outer edge of the sleeve inserted in the opening of the container, if desired, with interposition of a packing ring.

Other features characteristic of the invention will be more closely set forth in the following description of the embodiments of the invention disclosed on the accompanying drawing.

Fig. 1 shows how the liquid level gauge may be applied on the fuel container of a kerosene gasification lantern. Fig. 2 shows on a larger scale and in vertical section an embodiment of the liquid level gauge. Fig. 3 illustrates a plan view of the pointer disc with the pointer. Figs. 4 and 5 indicate vertical sections through two other embodiments.

On the drawing, I indicates the container which in the portion above the liquid level is provided with an opening into which a sleeve 2, being threaded on the outside, is inserted. Against the outer edge of said sleeve 2 abuts, with the interposition of a packing ring 3, a cover member 4 which is pressed against the packing ring 3 by a clamping ring 7 that is screwed on the sleeve and provided with a flange of abutment 6 and a window 5. The cover member is on its outside provided with a scale 8 and carries a pointer 10 rotatably journalled on an axis 9 secured to the cover member. At the inside of the cover member a horseshoe-formed magnet 11 is rotatably journalled on a threaded pin 12 being screwed into the cover member in alignment with the axis 9. To the one shank of the horseshoe magnet one end of a rod or arm 13 is secured, the other end of which carries a float 14 consisting for example of a cork. This float may be rigidly or movably, for example hingedly or pivotally, connected to the arm 13 which is so secured to the magnet that the float will act with a lever on the axis of rotation of the magnet in such manner that the magnet 11 and thus also the pointer 10, being made from magnetic material and actuated by the magnet, are turned when the liquid level in the container is rising or falling. The position of the arm 13 indicated by full lines in Fig. 2 is supposed to correspond to a practically emptied container, whereas the position of the arm 13 indicated by chained lines corresponds to a filled container.

The embodiment according to Fig. 4, is substantially identical with the described one. However, the cover member is somewhat modified therein that a special clamping ring is omitted. Instead, the cover member is provided, firstly with an inwardly projecting sleeve-formed flange 16 being threaded on the outside and screwed into a sleeve 17 inserted in the opening and threaded on the inside, secondly with a flange of abutment 18 which, upon screwing the sleeve-formed flange inwards, is tightened against the outer edge of the sleeve 17 by means of the interposed packing ring 3. Depending on the shape of the container and the space inside the same, the arm 13 may be made straight or curved and with a length suited to other conditions. To insure the positioning of the cover member 4 and thus of the pointer disc 8 in a predetermined position in relation to the flange 2 in the embodiment according to Fig. 2, the cover member and said flange may be provided with a recess and a projection respectively.

In the embodiment according to Fig. 5, the cover member 4 may be made in the same manner as in Fig. 2. According to Fig. 5, however, the magnet is made up of several parts, consisting of the straight part 19 running parallel with the pointer disc and being made from magnetisable steel, and the two bolts 20 secured to the part 19 perpendicularly to the latter and consisting of soft iron. The magnet consisting of the parts 19 and 20 is, as in the two previously described embodiments, rotatably journalled about a pin 12, secured to the cover member 4. The advantage with this embodiment is substantially to be seen therein that it is more suitable to mass production than the other ones.

Besides the embodiments illustrated on the drawing, several others may be developed. Thus, for instance, the parts 4 and 7 in Fig. 2 may be rigidly interconnected or made integral.

Instead of one magnet, several magnets may be used, and the float-actuated arm may of course be shaped in some other manner than illustrated, provided only that it acts with a lever upon the axis of rotation of the magnet.

Having now particularly described the nature of my invention and the manner of its operation what I claim is:

A liquid level gauge for liquid fuel containers of cooking stoves, comprising in combination, a cover member closing an opening in the liquid container, a horseshoe shaped magnet pivotally mounted on the inside of said cover member, a float, an arm carrying said float, said arm being also secured to said magnet in a manner to act on the magnet with a lever relatively to the axis of rotation of the magnet so as to turn the magnet when the float is rising or falling with the liquid level in the container, a pointer of magnetisable material pivotally journalled on the outside of said cover member about an axis of rotation in alignment with the axis of rotation of said magnet, a scale on the outside of said cover member adapted to register the position of said pointer and thus the liquid level in the container, said cover member having the shape of a disc provided with an inwardly projecting central hub portion and an inwardly projecting sleeve portion surrounding said hub portion in spaced manner so as to form an annular recess between them, said sleeve portion being fitted into a separate sleeve member secured in said opening of the container and projecting outwards from the latter so that an outwardly projecting space for the accommodation of said magnet is formed by said cover member and said sleeve member, and said magnet having its yoke portion rotatably secured to the interior end of said hub portion with its poles extending into said annular recess on the cover member.

BENGT OLOV JOHANSSON.